(12) United States Patent
Eichlseder et al.

(10) Patent No.: US 8,551,559 B2
(45) Date of Patent: Oct. 8, 2013

(54) METHOD FOR PRODUCING PLASTIC MOLDED PARTS HAVING AN INTEGRATED CONDUCTIVE TRACK

(75) Inventors: Martin Eichlseder, Tettenweis (DE); Helmut Piringer, Baldham (DE)

(73) Assignee: KraussMaffei Technologies GmbH, München (DE)

( * ) Notice: Subject to any disclaimer, the term of this patent is extended or adjusted under 35 U.S.C. 154(b) by 0 days.

(21) Appl. No.: 13/321,240

(22) PCT Filed: May 17, 2010

(86) PCT No.: PCT/EP2010/056697
§ 371 (c)(1),
(2), (4) Date: Feb. 6, 2012

(87) PCT Pub. No.: WO2010/133530
PCT Pub. Date: Nov. 25, 2010

(65) Prior Publication Data
US 2012/0128866 A1    May 24, 2012

(30) Foreign Application Priority Data
May 20, 2009  (DE) .......................... 10 2009 022 238

(51) Int. Cl.
*B05D 5/12*     (2006.01)
*B05D 3/00*     (2006.01)

(52) U.S. Cl.
USPC ....... 427/97.1; 427/96.2; 427/96.4; 427/97.2; 427/97.7; 427/98.4; 427/102

(58) Field of Classification Search
USPC ........... 427/96.2, 96.4, 97.1, 97.2, 97.7, 98.4, 427/102
See application file for complete search history.

(56) References Cited

U.S. PATENT DOCUMENTS 3,790,748 A * 2/1974 Van Laethem et al. ....... 219/219
4,251,316 A * 2/1981 Smallbone ...................... 216/18
(Continued)

FOREIGN PATENT DOCUMENTS

DE   35 06 011 A1   8/1986
DE   197 20 808 A1   7/1998
(Continued)

OTHER PUBLICATIONS

Herbst R et al.: "Die dreifache Kombination Mehrkomponenten-Spritzgiessen von Thermoplasten elastomeren und Duroplasten" Kunststoffe, Carl Hanser Verlag, Munich, Oct. 1, 2000; p. 82, 84/85, XP 000965889 ISSN: 0023-5563 p. 84, cols. 3, line 16, paragraph 2—line 20.

*Primary Examiner* — Brian K Talbot
(74) *Attorney, Agent, or Firm* — Henry M. Feiereisen LLC

(57) ABSTRACT

The invention relates to a method for producing a plastic molded part (9) comprising an integrated conductor path (3), which plastic molded part is used in particular as an intermediate product to be further processed into an electrically heatable mirror (1). The method steps are: a) producing a substrate (7) from a carrier body (2) made of an electrically insulating plastic material having a conductor path (3) made of an electrically conductive material on or in a surface (8) of the carrier body (2), b) flooding the surface (8) of the substrate (7) equipped with the conductor path (3) or the surface (11) of the substrate (7) opposite said surface with a liquid, electrically insulating coating material. The flooding evens out depressions due to uneven shrinkage in the thick and thin areas of the carrier body and a smooth surface can be produced, which can subsequently be covered with a reflective layer.

17 Claims, 6 Drawing Sheets

(56) References Cited

U.S. PATENT DOCUMENTS

| | | | |
|---|---|---|---|
| 4,352,006 A * | 9/1982 | Zega | 219/219 |
| 4,933,533 A * | 6/1990 | Simpson | 219/219 |
| 5,700,305 A * | 12/1997 | Lowe et al. | 65/60.1 |
| 5,990,449 A * | 11/1999 | Sugiyama et al. | 219/219 |
| 6,425,968 B1 | 7/2002 | Eichlseder et al. | |
| 6,634,405 B2 | 10/2003 | Eichlseder et al. | |
| 6,971,428 B2 | 12/2005 | Eichlseder et al. | |
| 7,014,454 B2 | 3/2006 | Eichlseder et al. | |
| 7,118,372 B2 | 10/2006 | Eichlseder et al. | |
| 7,445,743 B2 | 11/2008 | Eichlseder et al. | |
| 7,862,750 B2 | 1/2011 | Eichlseder et al. | |
| 2003/0000634 A1 | 1/2003 | Eichlseder et al. | |
| 2003/0128164 A1 | 7/2003 | Rahaim et al. | |
| 2004/0003908 A1 | 1/2004 | Singh et al. | |
| 2006/0011306 A1 | 1/2006 | Eichlseder et al. | |
| 2006/0027330 A1 | 2/2006 | Eichlseder et al. | |
| 2008/0116191 A1 * | 5/2008 | Allen et al. | 219/219 |
| 2009/0085235 A1 | 4/2009 | Eichlseder et al. | |

FOREIGN PATENT DOCUMENTS

| | | |
|---|---|---|
| DE | 197 24 320 A1 | 12/1998 |
| DE | 101 18 487 A1 | 10/2002 |
| DE | 10 2005 034895 B3 | 12/2006 |
| DE | 2005034895 * | 12/2006 |
| DE | 10 2008 015853 A1 | 10/2009 |
| EP | 0 732 865 | 9/1996 |
| EP | 1 705 152 A2 | 9/2006 |
| JP | 04-090203 * | 3/1992 |
| JP | 4 125117 A | 4/1992 |
| JP | 6 170883 A | 6/1994 |
| WO | WO 2007/101747 A1 | 9/2007 |
| WO | WO 2008/006483 | 1/2008 |

* cited by examiner

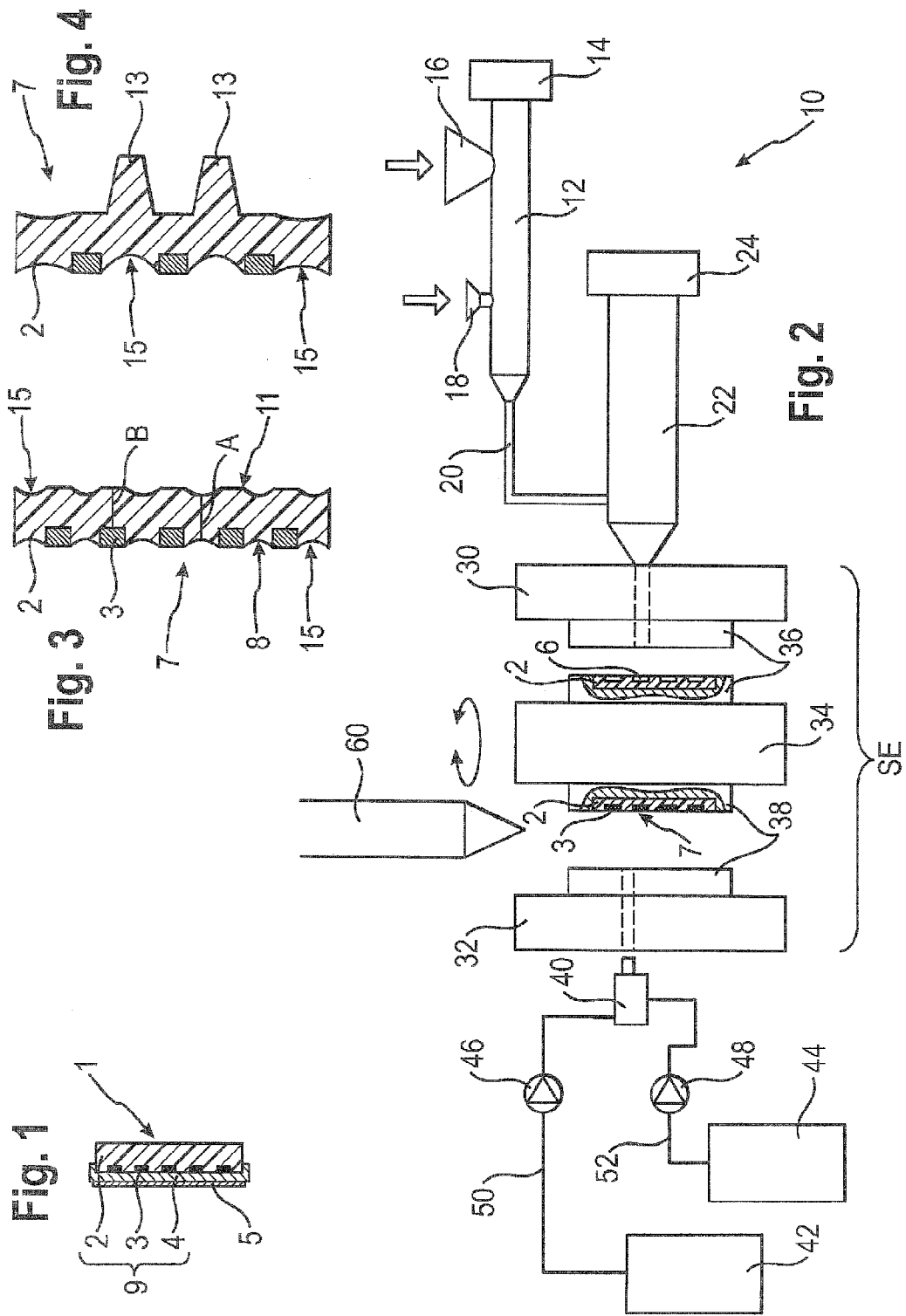

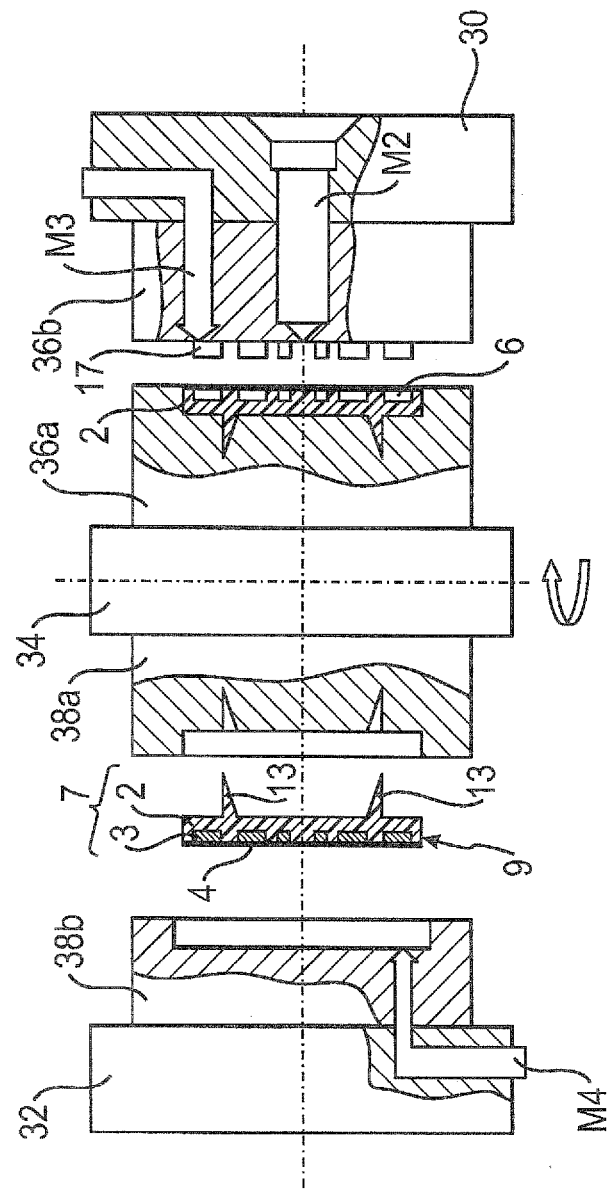

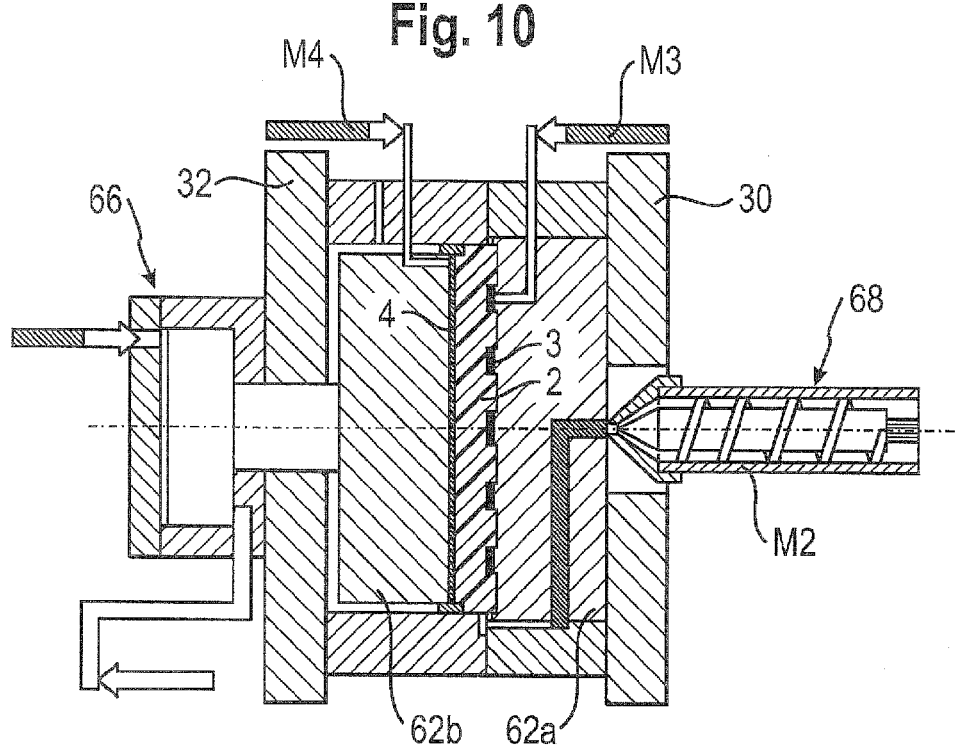
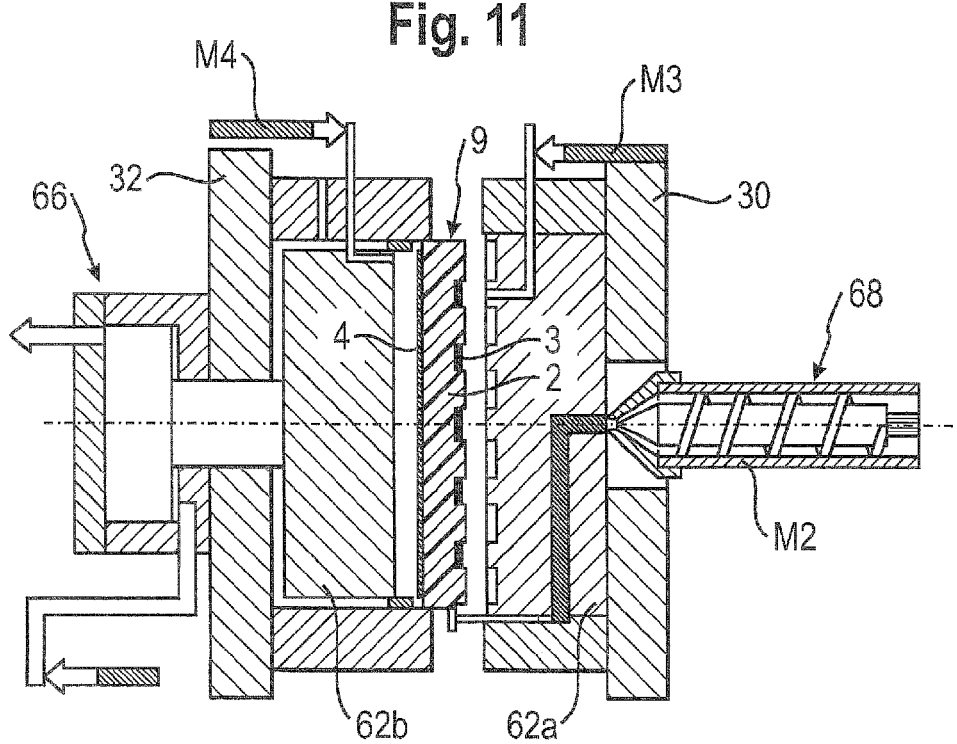

METHOD FOR PRODUCING PLASTIC MOLDED PARTS HAVING AN INTEGRATED CONDUCTIVE TRACK

CROSS-REFERENCES TO RELATED APPLICATIONS

This application is the U.S. National Stage of International Application No. PCT/EP2010/056697, filed May 17, 2010, which designated the United States and has been published as International Publication No. WO 2010/133530 and which claims the priority of German Patent Application, Serial No. 10 2009 022 238.3, filed May 20, 2009, pursuant to 35 U.S.C. 119(a)-(d).

BACKGROUND OF THE INVENTION

The invention relates to a method for producing plastic molded parts with an integrated conductor path, for example for subsequent processing to an electrically heatable mirror. Preferred application is the production of electrically heatable outside rearview mirrors for automobiles.

EP 0 732 865 B1 discloses a molded part with a heating device, in particular an outside rearview mirror of an automobile. The conventional outside rearview mirror includes a heating device having carbon fibers which are connected for current conduction and reinforced with a binder. The carbon fibers together with the binder form a fleece of carbon fibers, with free spaces disposed between the carbon fibers in the fleece. The fleece is overmolded with an electrically insulating plastic material in an injection molding process, wherein the plastic material also penetrates the free spaces. The carbon fibers in the finished molded body are then completely enclosed by the electrically insulating plastic material, with the exception of the current connecting lines.

WO 2008/006483 A1 discloses another embodiment of an electrically heatable outside rearview mirror for an automobile. The outside rearview mirror is manufactured by applying a conductor path made of a resistance material on the front side of a fleece with a thermal injection molding process according to DIN EN 657, whereby the rear side of the fleece is subsequently back-injected with a plastic material. In this way, the plastic material forms simultaneously the carrier plate for the mirror glass, which is attached on the front side of the fleece with an adhesive or an insulating varnish. Both mineral glass and transparent substrates made of thermoplastic or thermosetting materials can be used as mirror glass, with the reflection layer being applied on the side of the carrier plate.

The aforedescribed state-of-the-art has the disadvantage that the outside rearview mirrors are produced from several individual parts in several process steps, which disadvantageously affects the rejection rate.

Based on this state-of-the-art, it is the object of the invention to provide an improved method for producing a plastic molded part as a base for an outside rearview mirror, which is distinguished by a high degree of automation and which has a comparably low rejection rate. In addition, a flat optical surface without depressions should thus be achieved.

SUMMARY OF THE INVENTION

The object is attained by a method for producing an electrically heatable mirror, comprising the steps of: applying a conductor path made from an electrically conductive material on or in a first surface of a carrier body made from an electrically insulating plastic material to form a substrate; flooding a first surface of the substrate provided with the conductor path or a second surface of the substrate opposite the first surface with a liquid, electrically insulating coating material; and applying a reflective layer on the coating material.

By first producing a substrate from a carrier body of an electrically insulating plastic material with a conductor path made of electrically conducting material on or in a surface of the carrier body, and by subsequently flooding the substrate on the surface provided with the conductor path or an opposite surface with a liquid, electrically insulating coating material, all uneven spots on the coated surface of the substrate are evened out. A very thin layer with an extremely smooth surface is produced, onto which subsequently a reflective layer for the heatable mirror can be applied, preferably by sputtering.

The uneven spots are due to different shrinkage in the material of the carrier body in regions of the carrier body having different thicknesses. These are, on one hand, those regions which include clips for installation of the finished rearview mirror in a holder and, on the other hand, regions in the carrier body having different thicknesses which are formed because the conductor path is more or less strongly embedded in a surface, thereby creating the recesses. Conversely, the carrier body is thicker in the adjacent regions. This produces on both sides of the carrier body a more or less strongly undulated surface, which cannot be directly used for applying a reflective mirror layer.

The substrate may be provided with a reflecting layer on the side having the conductor path. In this case, the conductor path can be considered as being located on the mirror side of the substrate. The substrate, however, can also be provided with a reflecting layer on the opposite side. In this case, the conductor path can be considered to be located on the opposite mirror side. The coating is always provided where the reflecting layer is to be applied.

A finished outside rearview mirror is distinguished by a uniformly heatable surface without local temperature peaks (so-called hotspots). When the conductor path is arranged on the mirror side, it runs very close to the surface of the finished injection mold part. The heat generated during operation of the conductor path needs to penetrate only the thin layer made of the flooding material. This enables rapid heating of the outside rearview mirror. When the conductor path is located on the opposite mirror side, the generated heat must heat the visible surface of the outside rearview mirror through the substrate, which takes more time. On the other hand, the surface is thereby particularly uniformly heated.

Preferably, liquid varnishes are used as coating and flooding material, for example a UV-hardenable varnish or a multi-component reaction varnish, for example a PUR varnish or an acrylic varnish, in particular an acrylic varnish based on PMMA. Very thin layers in a range of 10 μm to 50 μm can be formed with these varnishes. Advantageously, the varnish may produce a scratch-proof coating after hardening. These varnishes are advantageous especially with long flow distances, in particular with a large ratio of flow distance to wall thickness, because their viscosity is similar to that of water. The coating or flooding material is then also referred to as being in a more or less aqueous state.

Coating with a low-viscosity plastic melt, for example based on PA, is also feasible. The viscosity of the plastic melt can be substantially reduced by suitably high melt and tool temperatures, so that the flow properties of this plastic melt are similar to those of the aforementioned liquid varnishes and can thus be processed with similar advantageous properties. To realize long flow distances, the tool temperature is dynamically increased and decreased during the course of the process. Thin layers in a range of approximately 100 μm to 1000 μm can be attained. However, the aforementioned varnishes are preferred with long flow distances, in particular with a large flow distance-to-wall thickness ratio.

Different variants of the process can be considered for producing a substrate from a carrier body made of an electrically insulating plastic material with a conductor path made of an electrically conducting material on or in a surface of the carrier body. Primarily, techniques of multi-component injection molding can be applied. Depending on the process flow, the conductor path is first produced in an injection molding process, and subsequently the electrically insulating plastic material of the carrier body is molded; alternatively, the process flow can be reversed, meaning said the carrier body made of electrically insulating plastic material is produced first by an injection molding process and subsequently the conductor path made from an electrically conducting material is applied with an injection molding process into recesses in the surface of the carrier body or is directly applied on a surface of the carrier body. The term injection molding process here in refers to all process flows where a plastic material is injected into a mold tool and molded. These include also known variants of injection compression-molding processes. A variant of the injection compression-molding is, for example, the so-called compression-molding where the plastic material is injected into an enlarged cavity and is compression-molded when the size of the cavity is decreased. Another variant of compression-molding is, for example, the so-called expansion molding, whereby the plastic material is injected into the opening mold tool and compressed when the mold tool closes. These and other methods of compression-molding are known to a skilled artisan and need therefore not be described in detail.

The material for the conductor path may be an intrinsic electrically conducting plastic (so-called ICP—Intrinsic Conductive Polymer), or conductive thermoplastic compounds may be provided as electrically conducting plastic material. The electrical resistance of such compounds can be adjusted as desired by suitable selection of the materials and their concentration.

In another embodiment, the carrier body may be produced in a first manufacturing step from an electrically insulating plastic material by an injection molding process, wherein recesses are formed in the carrier body commensurate with the desired conductor path, wherein the recesses are subsequently flooded with an electrically conducting liquid varnish, with the conductor path being formed in the recesses. Varnishes of the aforedescribed type can be used as electrically conducting varnish, wherein the electrical resistance can be adjusted in any desired manner through the selection and concentration of the filler materials. However, a comparably low-viscosity electrically conducting plastic melt can also be used for flooding and filling the recesses in the carrier body. For sealing the recesses against the surrounding area and against tool parts, the recess may only be partially demolded or released for flooding, whereas the region that was not demolded or released remains in engagement as a dip edge or a seal.

An insert, which is overmolded with the electrically conducting material of the conductor path and preferably additionally with the electrically insulating plastic material of the carrier body, may be provided at the contact locations to supply current. This insert may be, for example, a kind of plug with contact pins protruding from the conductor path for connection to electric wires.

At the end of the process steps, an plastic molded part is produced which has excellent stiffness and a very smooth surface. Only a reflective layer must still be applied, for example by sputtering, for obtaining a finished electrically heatable mirror with an optically smooth surface. A separate reflection layer may be omitted for mirrors with low demands for their reflectivity, so that the varnish may assume the role of a mirror. The stiffness and hardness of the cover layer made of the coating material may also prevent bending or scratching of the reflective layer. Optionally, additional functional layers, for example an additional protective layer, may also be applied on the reflective layer.

BRIEF DESCRIPTION OF THE DRAWING

Exemplary embodiments of the invention will now be described with reference to the drawings with show in:

FIG. 1 a cross-section through an electrically heatable outside rearview mirror of an automobile according to the invention;

FIG. 2 a schematic diagram of an injection molding machine with a rotary-platen closure unit;

FIGS. 3 and 4 on an enlarged scale, a schematic diagram of a substrate made of a carrier body and a conductor path;

FIG. 5 a schematic diagram of a process flow of a first embodiment of a method for producing a heatable rearview mirror according to the invention;

FIGS. 6-11 a schematic diagram of a process flow of another embodiment of a method for producing a heatable rearview mirror according to the invention;

DETAILED DESCRIPTION OF PREFERRED EMBODIMENTS

Figure 6:
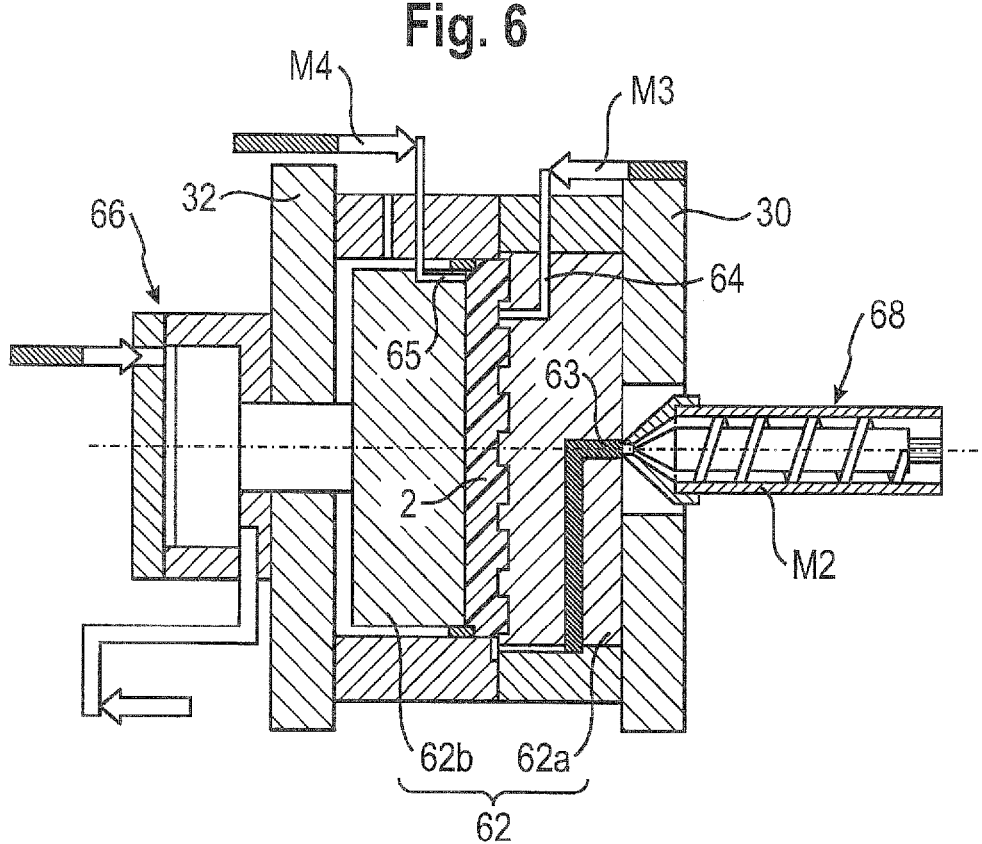
Figure 7:
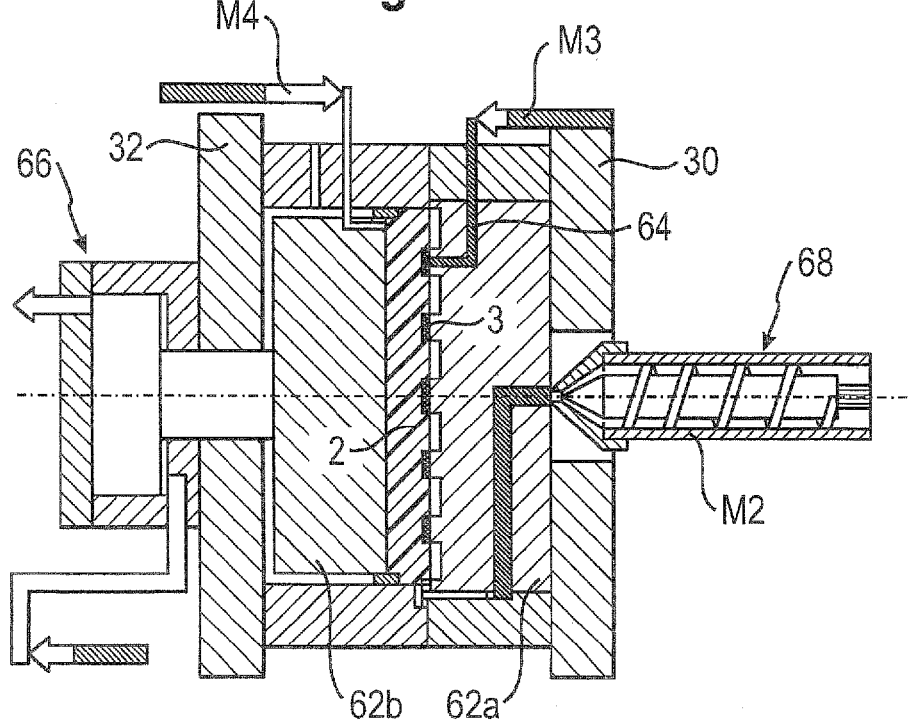
Figure 8:
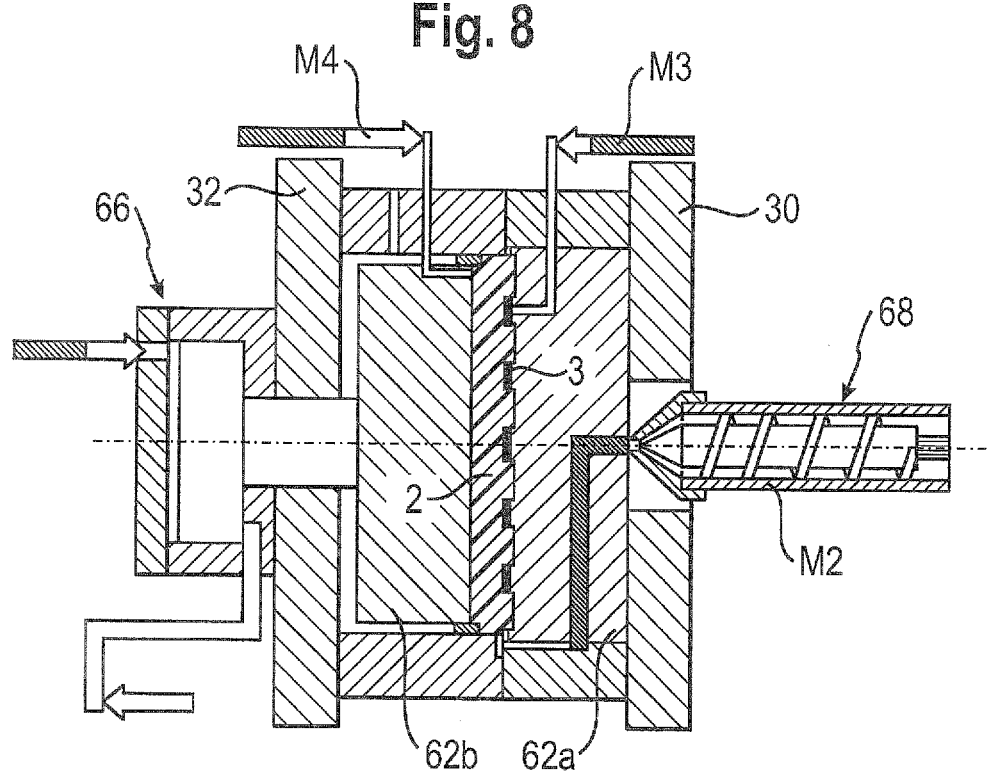

FIG. 1 shows a cross-section through an electrically heatable outside rearview mirror 1 of an automobile. A conductor path 3 for an electric resistance heater is disposed in a surface of a carrier plate 2 made of an electrically insulating plastic material. The pattern of this conductor path may be, for example, meander-shaped or serpentine-shaped. Other shapes are also feasible, depending on the application. The conductor path 3 and the exposed surface of the carrier body 2 are covered with a scratch-resistant layer 4 made of a liquid varnish. These layers together form a plastic molded part 9 on which the reflective layer 5 of the outside rearview mirror is disposed.

FIG. 2 shows schematically an injection molding machine with a rotary-platen closure unit SE, including two outer mold platens 30 and 32 and as an additional mold half carrier a rotary-platen 34 which can rotate about a vertical axis. The most halves of injection molding tools 36 and 38 are located between the two separation planes, with FIG. 2 showing the closure unit in an open state. For sake of clarity of the drawing, the means for closing and opening the closure unit SE and for generating the closure force are not shown. These are known to a skilled artisan and therefore need not be described further at this point. A plasticizing and injection device 10 for producing a plastic melt for the carrier body 2 is associated with the right outer mold platen 30. The device 10 includes in the present example an extruder 12 with a rotary drive 14, preferably a double screw extruder with two screws rotating in the same direction, and a piston injection device 22 with a linear drive 24, which are connected with each other by a line 20. The starting materials for the plastic melt of the carrier body and/or the carrier plate 2 can be introduced into the extruder 12 for processing by way of hoppers 16 and 18. For example, a granulate of a basic plastic material may be added via the hopper 16 and a glass fiber material may be added via the hopper 18, so that the carrier plate is produced from a stable electrically insulating plastic material containing glass fibers. The plastic material for the conductor path can be introduced into the injection molding tool 38 via an additional injection device 60 (in the L-position or in the vertical position) and joined with the carrier body 2. A polyurethane device, which has a mixing head 40 connected via supply lines 50 and 52 with containers for a polyol component 42 and an isocyanate component 44, is associated with the left mold platen 32. The corresponding components are transported from the containers 42 and 44 into the mixing head 40 by interposed pumps 46 and 48. The PUR varnish may be introduced into the mold tool 38 from the mixing head 40 and flood the surface of the substrate 7 formed by the carrier body 2 with the embedded conductor path 3. The reaction mixture then fully reacts at that location, evening out depressions in the surface of the substrate 7 and producing an extremely smooth exterior surface. Instead of the PUR varnish, other liquid varnishes may also be used, for example a UV-hardenable varnish or an acrylic varnish, in particular an acrylic varnish based on PMMA. If a pre-mixture is available, the illustrated storage containers 42, 44 with lines 50, 52 and pumps 46, 48 can be eliminated.

Flooding with the varnish can occur in a manner so that a cavity is produced in the mold 38, starting from the closed mold, into which the varnish can be injected. An optional compression step is subsequently performed, whereby the cavity is reduced in volume and the varnish is distributed across surface of the substrate where it then can finally react.

At the end of the process flow, a plastic molded part 9 is produced, which consists of the layers 2, 3 and 4 and only requires coating with the reflective layer 5 after removal from the injection molding machine. If necessary, additional layers may be applied on the reflective layer.

FIGS. 3 and 4 show schematically on a greatly enlarged scale substrates 7 made of the carrier body 2 and the conductor path 3. The aforementioned depressions 15 are formed as a result of the different shrinkage of the material at locations of the carrier plate 2 that have different thicknesses. Shrinkage is greater in regions without depressions (line A) than in regions where the depressions for the conductor path 3 are located (Line B). The depth of the depressions can be reduced by countermeasures, such as for example "careful" compression molding. However, small depressions still remain, which would make the surfaces unusable for direct optical purposes. Due to the depressions, "undulated" surfaces 8 and 11 are present on both sides of the substrate which are unsuited for application of the reflective layer. At those locations where the carrier plate 2 has clips 13 for subsequently attachment in a holder, the depressions 15 are more pronounced, as illustrated in the exemplary embodiment of FIG. 4. In addition, depending on the material combination of conductor path 3 and carrier grade 2, gaps or cracks may form between the conductor path 3 and to carrier body 2, which can be filled by the coating material.

FIG. 5 shows schematically a process flow when using a rotary-platen closure unit SE with mold tools 36, 38 with mold halves 36a, 36b, 38a, 38b, wherein the mold halves 36a and 38a attached on the rotary played 34 are identical. At a first step, the carrier plate 2 is produced by an injection molding process, for example a compression-injection molding process, wherein the electrically insulating plastic material is injected into the first mold tool 36 via a material supply M2. The rotary platen 34 is then retracted from the stationary mold platen 30 by a short distance, thereby exposing the recesses 6 for the conductor path. The opening occurs only so far so that the core 17 with a contour of the conductor path 3 on the stationary mold half 36b protrudes only slightly into the recesses 6 or is flush with them. This core 17 forms so-called dip edges effecting a seal. A cavity is thereby formed for the recesses 6, into which the material for the conductor path 3 can be introduced via a suitable material supply M3. Optionally, a compression methods may be also be used. After this step, a carrier plate 2 with the conductor path 3, i.e. a substrate 7, is located in the mold half 36a on the rotary platen 34. After the rotary-platen closure unit SE is opened, the rotary platen 34 is rotated by 180°, with the substrate 7 remaining in the mold half 36a. The closure unit is then again closed, leaving a gap for introducing the coating material. This gap is typically greater than the thickness of the finished layer of coating material. The coating material, for example a suitable varnish, can then be introduced into this gap and the substrate 7 can be flooded with a varnish layer 4. With a time offset from or simultaneously with the flooding, the mold halves 38b and 36a (or 38a) are closed and the coating material is distributed on the substrate 7 and compressed, thereby lastly producing the varnish layer 4 on the substrate 7. Depressions 15 on the surface of the substrate 7 (see FIGS. 3 and 4) are hereby evened out, so that a smooth and flat surface for a subsequent coating process is available on the substrate 7 with the varnish layer 4. After the varnish layer 4 has hardened, the closure unit SE can be opened and the finished molded plastic part 9 with the integrated conductor path 3 and the varnish layer 4 can be removed. In the following sputtering process, a reflective layer 5 can be applied on the varnish layer 4 to produce a mirror, in particular an outside rearview mirror 1, as illustrated in FIG. 1; however, in the present example, additional clips 13 for subsequently attachment of the outside rearview mirror in a corresponding holder on a vehicle are provided. In the described exemplary embodiment, the conductor path is on the mirror side.

FIGS. 6-11 show a schematic diagram of another embodiment of a method according to the invention, which will now be described, whereby the conductor path of the finished outside rearview mirror is located on the side opposite the mirror. In this exemplary embodiment, the aforedescribed rotary-platen closure unit SE is not used. Mold halves of an compression injection molding tool 62 are mounted in a closure unit having a stationary mold platen 30 and a movable mold platen 32, wherein the mold half 62b on the left side of the Figures can be advanced and retracted with a suitable compression device 66, for example a piston-cylinder unit. Suitable sprue channels 63, 64 and 65 for the introduction of the materials are provided in the mold halves. The material for the electrically insulating plastic of the carrier body 2, for example PMMA, can be processed by a plasticizing and injection unit 68 and supplied via the material supply M2 with the sprue channels 63. The electrically conducting material for the conductor path 3 can be supplied via a material supply M3 and a sprue channel 64 in the mold half 62a, and the coating material for the varnish layer 4 can be supplied via a material supply M4 and a sprue channel 65 in the mold half 62b.

Figure 9:
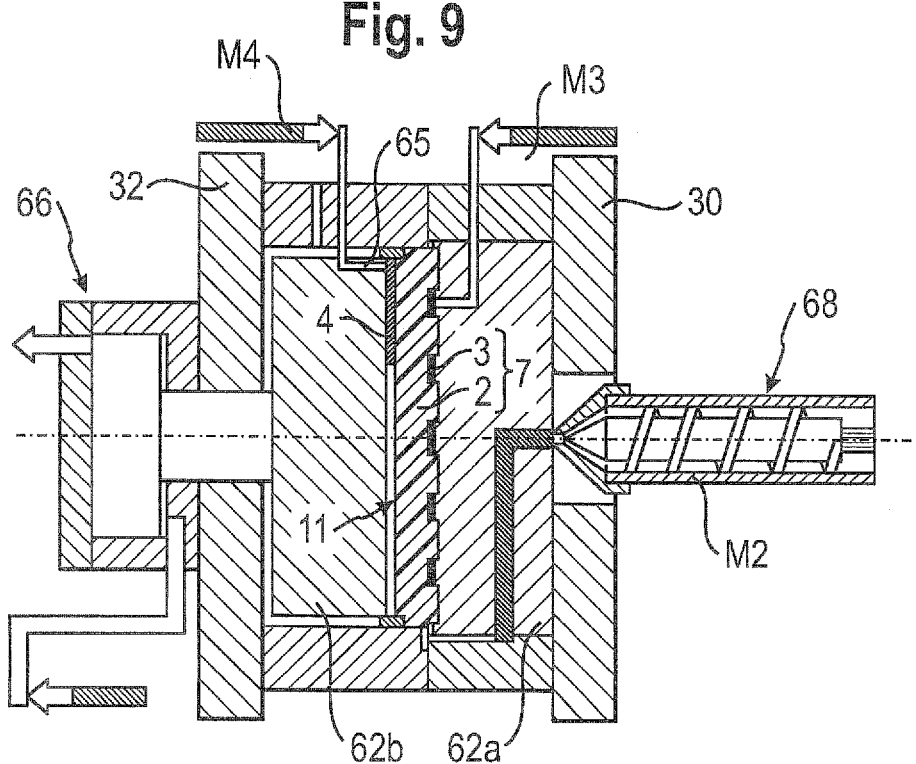

The process flow is as follows. At a first step, the material for the carrier body 2 is injected into a corresponding cavity and optionally compressed (FIG. 6). At the following step, the mold half 62b is retracted from the mold half 62a by a small distance, for example with a compression device 66, in order to form a gap commensurate with the recesses 6 for the conductor path 3. The travel is selected such that the projections in the mold half 62a, which form the core 17 for the conductor path structure, remain engaged with the recesses 6 and seal the recesses 6. The electrically conducting material for the conductor path 3 can now be injected into the recesses via the sprue channel 64 (FIG. 7) and compressed (FIG. 8), until a substrate 7 is produced which has on both sides the aforementioned (unillustrated) depressions. At the next step, the mold half 62b is once more retracted from the mold half 62a by small distance, thereby forming a gap for the coating material, i.e. for the varnish layer 4, between the substrate 7 and the mold half 62a (FIG. 9). To even out the depressions on the surface 11 of the substrate 7 facing the mold half 62b, the coating material, e.g. a suitable varnish, can now be introduced into the gap via a material supply M4 and a sprue channel 65, and the substrate 7 can be flooded. The mold half 62b is subsequently (FIG. 10) moved again with the compression device 66 towards the mold half 62a, compressing the varnish layer 4. At the end of the production process, the closure unit can be opened, the finished molded plastic part 9 can be demolded and removed from the injection molding tool (FIG. 11). At a subsequent processing step, a reflective layer can be applied on the varnish layer 4 of this molded plastic part 9, forming a finished outside rearview mirror. In contrast to the aforedescribed exemplary embodiments, the conductor path 3 is hereby on the opposite side of the mirror.

Figure 12:
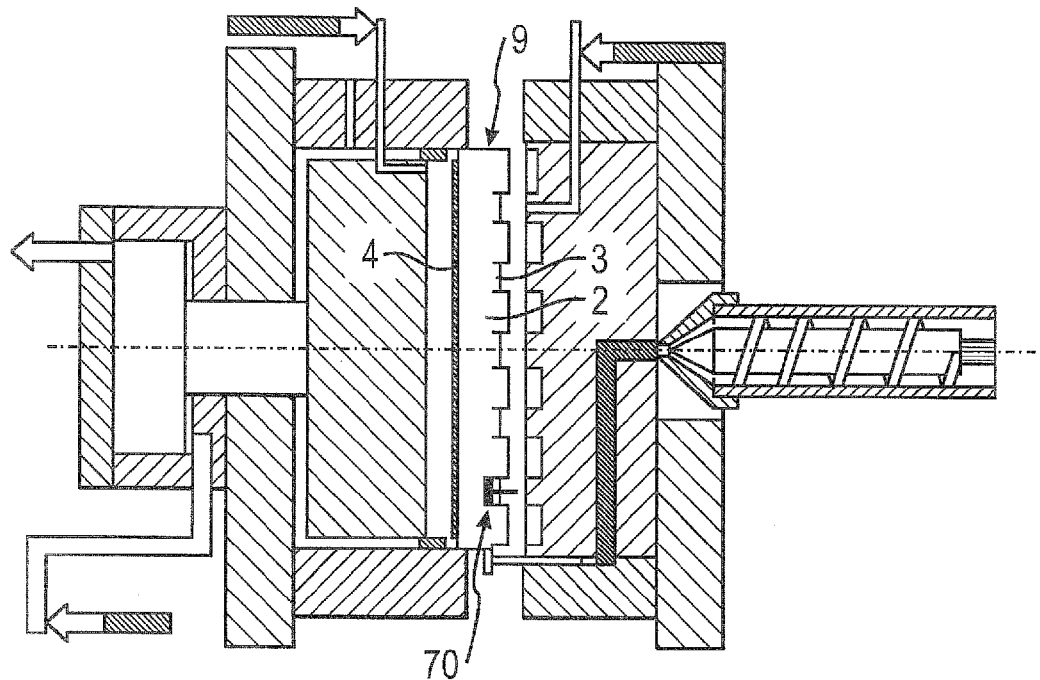
FIGS. 12 and 13 a plug connected to the current path of an electrically heatable outside rearview mirror of an automobile according to the invention.
Figure 13:
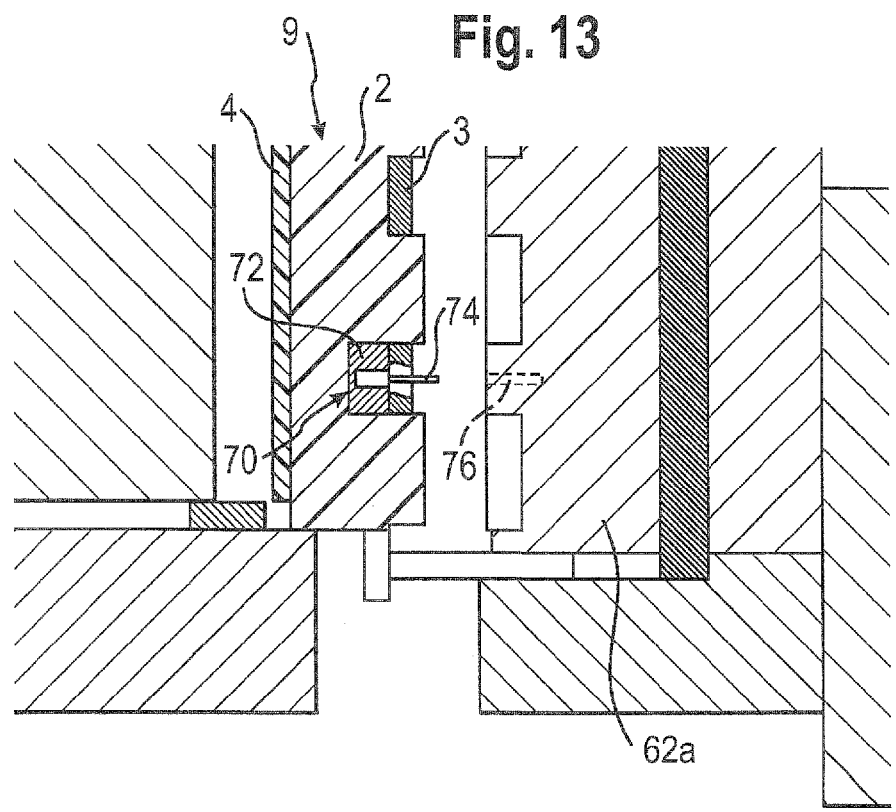

A kind of plug, which will be briefly described in conjunction with FIGS. 12 and 13, can be provided to connect the electric cables for supplying current to the conductor path 3, wherein for sake of clarity the crosshatching for the carrier plate 2 and the black fields for the conductor path 3 are not shown in FIG. 12. The plug 70 has a head 72 made of plastic having excellent electrical conductivity and an embedded pin 74 made from, for example, copper or another suitable material. This plug 70 can be overmolded as an insert by the carrier plate and the material of the conductor path, as schematically indicated in FIG. 13, wherein the conductor path 3 is illustrated in this region with a recess to more prominently show the contact pin 74. In actuality, the contact pin 74 is completely enclosed by the material of this conductor path in the region of the conductor path 3. The mold half 62a has a matching recess 76 for receiving this insert. The recess 76 is indicated in FIGS. 12 and 13 by the dashed line. A full-area contact between the electrically conducting plug 70 and the conductor path 3 is produced by overmolding, thereby preventing overheating at the contact locations under current flow.

While in the aforedescribed exemplary embodiment the carrier body is molded first and the conductor path is molded subsequently, the reverse order may also be considered. For example, the conductor path could be produced in a first step which is subsequently overmolded with the material of the carrier body. The mold halves need only be designed in a suitable manner and, if necessary, "correctly" arranged and operated in a rotary-plate closure unit SE.

The invention claimed is:

1. A method for producing an electrically heatable mirror, comprising the steps of:
    a) applying a conductor path made from an electrically conductive material on or in a first surface of a carrier body made from an electrically insulating plastic material to form a substrate, said conductor path having an electrical resistance forming a heater with application of an external electrical current to the conductor path;
    b) flooding a first surface of the substrate provided with the conductor path or a second surface of the substrate opposite the first surface with a liquid, electrically insulating coating material; and
    c) applying a reflective layer on the coating material, thereby producing an electrically heatable mirror with an optically smooth reflective surface.

2. The method of claim 1, wherein the coating material comprises a liquid varnish.

3. The method of claim 2, wherein the liquid varnish comprises a low-viscosity aqueous or scratch-resistant varnish.

4. The method of claim 2, wherein the electrically conductive material comprises an electrically conductive plastic.

5. The method of claim 4, wherein the electrically conductive plastic comprises an intrinsically electrically conducting plastic, an electrically conducting thermoplastic compound or an electrically conducting liquid varnish.

6. The method of claim 2, wherein the liquid varnish comprises a UV-hardening varnish or a multi-component reaction varnish.

7. The method of claim 6, wherein the multi-component reaction varnish comprises a PUR varnish or an acrylic varnish.

8. The method of claim 7, wherein the acrylic varnish is based on PMMA.

9. The method of claim 1, wherein the coating material comprises a low-viscosity plastic melt.

10. The method of claim 1, wherein the carrier body is produced from an electrically insulating plastic material by an injection molding process before the conductor path is applied by injection molding into recesses formed in the first surface of the carrier body or applied on the first surface of the carrier body.

11. The method of claim 1, wherein applying the conductor path on or in a first surface of the carrier body comprises producing first the conductor path from an electrically conducting plastic material by an injection molding process, and thereafter applying the conductor path on the first surface.

12. The method of claim 1, wherein the carrier body is produced from an electrically insulating plastic material by an injection molding process, wherein recesses are formed in the carrier body commensurate with a desired conductor path, and wherein the formed recesses are flooded with an electrically conductive liquid varnish, with the conductor path being formed in the recesses.

13. The method of claim 1, wherein the electrically conductive material comprises a UV-hardening varnish or a multi-component reactive varnish, wherein the varnish is intrinsically electrically conducting or wherein electrically conducting additives are present in the varnish, with the electrically conducting varnish of the conductor path being electrically conducting for an electric resistance heater.

14. The method of claim 13, wherein the electrically conducting varnish comprises a PUR varnish or an acrylic varnish.

15. The method of claim 14, wherein the acrylic varnish is based on PMMA.

16. The method of claim 10, wherein the electrically conductive material comprises a low-viscosity electrically conductive plastic melt, with the electrically conducting material of the conductor path being electrically conducting for an electric resistance heater.

17. The method of claim 16, wherein the electrically conductive plastic melt comprises an intrinsically electrically conductive plastic or an electrically conductive thermoplastic compound.

* * * * *